US012607828B2

(12) United States Patent
Liu et al.

(10) Patent No.: US 12,607,828 B2
(45) Date of Patent: Apr. 21, 2026

(54) OPTICAL LENS

(71) Applicant: GENIUS ELECTRONIC OPTICAL (XIAMEN) CO., LTD., Xiamen (CN)

(72) Inventors: Changwei Liu, Xiamen (CN); Haibin Zhan, Xiamen (CN); Weiwei Fu, Xiamen (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 532 days.

(21) Appl. No.: 18/076,399

(22) Filed: Dec. 7, 2022

(65) Prior Publication Data

US 2024/0126048 A1 Apr. 18, 2024

(30) Foreign Application Priority Data

Oct. 12, 2022 (CN) .......................... 202211249753.7

(51) Int. Cl.
*G02B 13/00* (2006.01)
*G02B 7/02* (2021.01)

(52) U.S. Cl.
CPC ......... *G02B 13/0035* (2013.01); *G02B 7/021* (2013.01); *G02B 7/025* (2013.01)

(58) Field of Classification Search
CPC .......... G02B 7/02; G02B 7/021; G02B 7/022; G02B 7/023; G02B 7/025; G02B 7/026; G02B 13/0035
See application file for complete search history.

(56) References Cited

U.S. PATENT DOCUMENTS

| | | | | | |
|---|---|---|---|---|---|
| 7,835,071 | B2 * | 11/2010 | Izumi | ................. | G02B 27/0037 |
| | | | | | 359/356 |
| 2006/0158748 | A1 * | 7/2006 | Hirata | .................... | G02B 27/62 |
| | | | | | 359/811 |
| 2008/0165430 | A1 * | 7/2008 | Bareau | ............... | G02B 13/0035 |
| | | | | | 359/690 |
| 2008/0267603 | A1 * | 10/2008 | Jung | .................. | G02B 13/0035 |
| | | | | | 396/111 |
| 2011/0038065 | A1 * | 2/2011 | Miyawaki | .......... | G02B 13/0035 |
| | | | | | 228/121 |
| 2021/0041666 | A1 * | 2/2021 | Hoshi | ................ | G02B 13/0045 |
| 2021/0364725 | A1 * | 11/2021 | Chang | ................ | G02B 13/0065 |
| 2021/0364731 | A1 * | 11/2021 | Chang | ................ | G02B 13/0065 |
| 2022/0113489 | A1 * | 4/2022 | Xu | .......................... | G02B 7/021 |
| 2022/0179289 | A1 * | 6/2022 | Yokoyama | ............. | G02B 7/022 |

* cited by examiner

*Primary Examiner* — Ephrem Z Mebrahtu
(74) *Attorney, Agent, or Firm* — JCIPRNET

(57) ABSTRACT

An optical lens has an optical axis. The optical lens includes a lens barrel, a first lens element, a lens element group, and an optical element. The lens barrel has a first opening and a second opening opposite to each other, and the first opening is smaller than the second opening. The first lens element abuts against the lens barrel. The lens element group is fitted with the first lens element. The optical element includes a fixing portion and a bearing portion connected to each other. The fixing portion abuts against the lens barrel, the bearing portion abuts against the lens element group, and the fixing portion has a protrusion extending toward a direction of the first lens element. The protrusion is positioned between the lens barrel and the lens element group in a radial direction.

20 Claims, 3 Drawing Sheets

OPTICAL LENS

CROSS-REFERENCE TO RELATED APPLICATION

This application claims the priority benefit of China application serial no. 202211249753.7, filed on Oct. 12, 2022. The entirety of the above-mentioned patent application is hereby incorporated by reference herein and made a part of this specification.

BACKGROUND

Technical Field

The disclosure relates to an optical element, and in particular relates to an optical lens.

Description of Related Art

In recent years, optical imaging lenses have continued to evolve. In addition to requiring optical imaging lenses to be light, thin, and short, it is also more and more important to expand the field of view of optical imaging lenses and improve imaging quality such as lens aberration and chromatic aberration. However, during the process of glue dispensing and curing, the lens barrel of an optical lens may deform due to the shrinkage of the glue, which causes the displacement and decentering of internal parts (such as lens elements), negatively affecting the optical quality.

By suitably reducing the outer diameter of the lens element, the lens element does not directly contact the lens barrel, which may avoid the influence of the lens barrel on the lens element to a certain extent. However, while the outer diameter of the lens element is reduced, the fit with adjacent elements and the stability after combination must also be considered. Therefore, how to strike a balance between various issues such as taking into account the fitting and combination of lens elements, effectively avoiding the influence of the lens barrel, and the manufacturability of the lenses themselves has become the main focus of research and development to those skilled in the art.

SUMMARY

The disclosure provides an optical imaging lens, which has small volume and good assembly quality, and maintains good optical quality.

The disclosure provides an optical lens with an optical axis. The optical lens includes a lens barrel, a first lens element, a lens element group, and an optical element. The lens barrel has a first opening and a second opening opposite to each other, and the first opening is smaller than the second opening. The first lens element abuts against the lens barrel. The lens element group is fitted with the first lens element. The optical element includes a fixing portion and a bearing portion connected to each other. The fixing portion abuts against the lens barrel, the bearing portion abuts against the lens element group, and the fixing portion has a protrusion extending toward a direction of the first lens element. The protrusion is positioned between the lens barrel and the lens element group in a radial direction. The first lens element, the lens element group, and the optical element are sequentially arranged from the first opening to the second opening.

The disclosure provides an optical lens which includes a lens barrel, a first lens element, a lens element group, and an optical element. The lens barrel has a first opening and a second opening opposite to each other, and the first opening is smaller than the second opening. The first lens element abuts against the lens barrel. The lens element group is fitted with the first lens element. The optical element includes a fixing portion and a bearing portion connected to each other. The fixing portion abuts against the lens barrel, the bearing portion abuts against the lens element group, and a minimum vertical distance from the fixing portion to an optical axis is greater than a maximum vertical distance from the bearing portion to the optical axis. The first lens element, the lens element group, and the optical element are sequentially arranged from the first opening to the second opening.

Based on the above, regarding the optical lens of the disclosure, the optical element includes a fixing portion and a bearing portion connected to each other. The fixing portion abuts against the lens barrel, and the bearing portion abuts against the lens element group. The fixing portion has a protrusion extending toward a direction of the first lens element, and the protrusion is positioned between the lens barrel and the lens element group in a radial direction. In this way, the contact area between the optical element and the lens barrel may be increased by the protrusion, which extends toward the first lens element, of the optical element disposed on the optical lens, so as to ensure an adhesive area between the optical element and the lens barrel after glue dispensing. Therefore, the lens element may be effectively fixed with sufficient thrust in a direction parallel to the optical axis. On the other hand, the protrusion between the lens barrel and a maximum outer diameter of the lens that is in the lens element group may also keep the lens element group away from an inner wall of the lens barrel, so as to avoid the glue that is dispensed on the lens barrel from pulling or squeezing the lens element group due to a deformation of the glue during a curing process, which in turn causes decentering.

In order to make the above-mentioned features and advantages of the disclosure more comprehensible, the following embodiments are given and described in detail with the accompanying drawings as follows.

DESCRIPTION OF THE EMBODIMENTS

Figure 1:
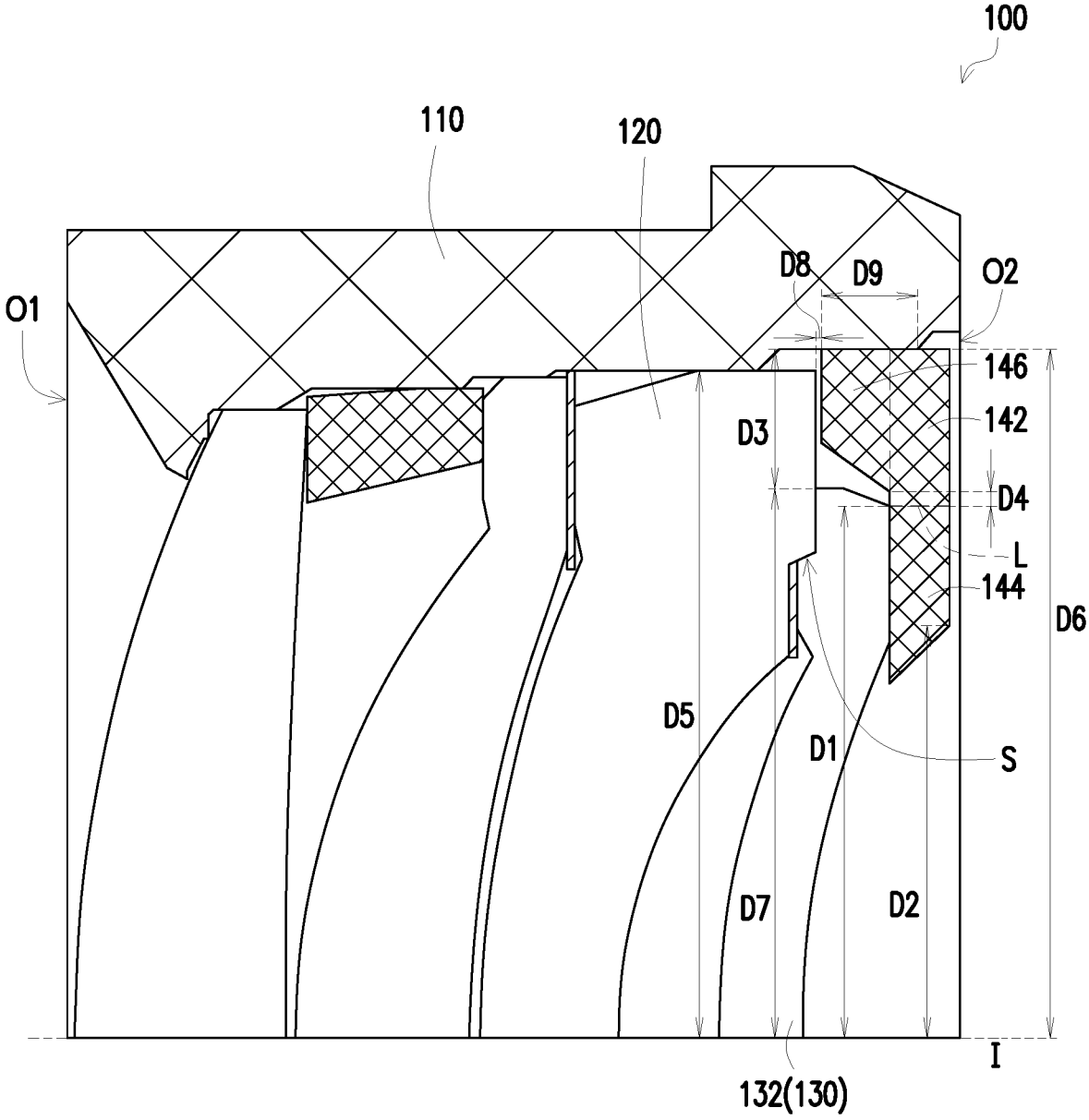
FIG. 1 is a schematic cross-sectional view of an optical lens according to the first embodiment of the disclosure.

FIG. 1 is a schematic cross-sectional view of an optical lens according to the first embodiment of the disclosure. Please refer to FIG. 1. In this embodiment, an optical lens 100 may be applied to a camera lens, a mobile phone lens, a telescopic lens, a head-mounted display, etc., but the disclosure is not limited thereto. The optical lens 100 includes a lens barrel 110, a first lens element 120, a lens element group 130 and an optical element 140. The lens barrel 110 has a first opening O1 and a second opening O2 opposite to each other, and the first opening O1 is smaller than the second opening O2. The first lens element 120, the lens element group 130, and the optical element 140 are sequentially arranged from the first opening O1 to the second opening O2. The lens barrel 110 is used to install the first lens element 120, the lens element group 130, the optical element 140, and other objects. In other words, the lens barrel 110 may be equipped with other optical lenses, and the disclosure is not limited thereto.

The first lens element 120 abuts against the lens barrel 110, and the lens element group 130 is fitted with the first lens element 120. A thickness of any lens element in the lens element group 130 on an optical axis I is less than or equal to the thickness of the first lens element 120 on the optical axis I. In addition, an optical effective diameter of any lens element in the lens element group 130 is smaller than the optical effective diameter of the first lens element 120. For example, in this embodiment, the lens element group 130 includes a second lens element 132. The optical lens 100 satisfies the following formula: ODLB/TLB≤7.500; ODLB is a maximum outer diameter D7 of the lens element group 130; and TLB is a thickness of the lens element with a maximum outer diameter in the lens element group 130 on the optical axis I. In this way, the difficulty in lens element processing may be effectively reduced, and a mold releasing problem during demolding may be alleviated, which is beneficial to the stability of molding and reducing the risk of cracks in the lens element after heating. In this embodiment, the lens element group 130 may include only one lens element, but the disclosure is not limited thereto.

The optical element 140 includes a fixing portion 142 and a bearing portion 144 which are connected to each other. The fixing portion 142 abuts against the lens barrel 110, and the bearing portion 144 abuts against the lens element group 130. Specifically, the fixing portion 142 and the bearing portion 144 are integrally formed. The fixing portion 142 and the bearing portion 144 may be defined by a dividing line L parallel to a direction of the optical axis I, and the dividing line L is a boundary where the bearing portion 144 abuts against the lens element group 130. In other words, the fixing portion 142 is not in direct contact with the lens element group 130. The fixing portion 142 has a protrusion 146 extending toward a direction of the first lens element 120. The protrusion 146 is positioned between the lens barrel 110 and the lens element group 130 in a radial direction. On the other hand, a minimum vertical distance D1 from the fixing portion 142 to the optical axis I is greater than a maximum vertical distance D2 from the bearing portion 144 to the optical axis I. In this embodiment, a minimum thickness of the fixing portion 142 of the optical element 140 in a direction perpendicular to the optical axis I is 0.100 mm, which ensures that there is no filling problem when the optical element 140 is formed. If the minimum thickness of the fixing portion 142 of the optical element 140 in the direction perpendicular to the optical axis I is less than 0.100 mm, filling problem may arise when the optical element 140 is formed, and also, difficulties such as component deformation may arise during demolding.

In this way, a contact area between the optical element 140 and the lens barrel 110 may be increased by the protrusion 146, which extends toward the first lens element 120, of the optical element 140 disposed on the optical lens 100, so as to ensure an adhesive area between the optical element 140 and the lens barrel 110 after glue dispensing. Therefore, the lens may be effectively fixed with sufficient thrust in a direction parallel to the optical axis I. On the other hand, the protrusion 146 between the lens barrel 110 and a maximum outer diameter of the lens that is in the lens element group 130 may also keep the lens element group 130 away from an inner wall of the lens barrel 110, so as to avoid the glue that is dispensed on the lens barrel 110 from pulling or squeezing the lens element group 130 due to the shrinkage of the glue during the curing process, which in turn causes decentering.

In this embodiment, a minimum distance D3 from the lens element group 130 to the lens barrel 110 is greater than or equal to 0.150 mm. In addition, on a reference plane perpendicular to the optical axis I, a minimum distance D4 between the protrusion 146 and the lens element group 130 on the reference plane is greater than or equal to 0.020 mm. Furthermore, the optical lens 100 satisfies the following formulas: 3,000≤ODLA/(ODR−ODLB)≤10,000 and ALAR−ODLB≥0.300 mm; ODLA is a maximum outer diameter D5 of the first lens element 120; ODR is a maximum outer diameter D6 of the optical element 140; ODLB is a maximum outer diameter D7 of the lens element group 130; and ALAR is an average value of the maximum outer diameter D5 of the first lens element 120 and the maximum outer diameter D6 of the optical element 140. In this way, since a wall of the lens barrel 110 may have a displacement of −30 μm to 30 μm due to the curing process of the glue (it should be noted that the displacement of −30 μm means that a direction of the deformation of the wall of the lens barrel 110 is toward the direction of the optical axis I, and the displacement of 30 μm means that the direction of the deformation of the wall of the lens barrel 110 is away from the optical axis I), reducing an outer diameter D7 of the lens in the lens element group 130 (i.e., the second lens element 132) may also keep the lens element group 130 away from the inner wall of the lens barrel 110, so as to avoid the lens element group 130 from decentering due to the situation that the deformation of the glue is pulling or squeezing the lens element group 130. In addition, maintaining a certain gap between the outer diameter D7 of the lens (i.e., the second lens element 132) of the lens element group 130 and the fixing portion 142 of the optical element 130 may improve the assembly accuracy of elements and further reduce the risk of decentering of the lens element group 130 caused by the deformation of the lens barrel 110. In addition, for the lenses of the lens element group 130, a reduction of the outer diameter may alleviate a mold releasing problem during demolding, which is beneficial to the stability of molding and reducing the risk of cracks in the lens element after heating.

On the other hand, in this embodiment, a minimum distance D8 in the direction of the optical axis I from the first lens element 120 to the optical element 140 is less than or equal to 0.100 mm. A minimum distance D8 from the first lens element 120 to the optical element 140 in the direction of the optical axis I may be greater than 0.020 mm. For example, in this embodiment, the optical lens 100 satisfies the following formula: DR/DA≥1.500; DR is the contact length D9 between the fixing portion 142 of the optical element 140 and the lens barrel 110 in the direction parallel to the optical axis I; and DA is the minimum distance D8 from the first lens element 120 to the optical element 140 in the direction of the optical axis I. Therefore, while increasing the contact area between the optical element 140 and the lens barrel 110, the lens volume may still be kept small, and the fixing portion 142 of the optical element 140 is positioned between the lens element group 130 and the lens barrel 110, which may increase the thrust without generating stray light. In addition, since a contact straight section (that is, the contact length D9 between the fixing portion 142 of the optical element 140 and the lens barrel 110 along the direction parallel to the optical axis I) between the optical element 140 and the lens barrel 110 is dispensed with glue, increasing the contact straight section is equivalent to increasing the adhesive area. Therefore, the capability of a lens system to bear the thrust in the direction of the optical axis I increases. On the other hand, when the first lens element 120 is not in contact with the optical element 140, it is ensured that one element only bears against another element, avoiding the situation that one element bears against other two elements at the same time (for example, the first lens element 120 bears against the lens element group 130 and bears against the optical element 140 at the same time) and results in difficulty in controlling assembly height.

Figure 2:
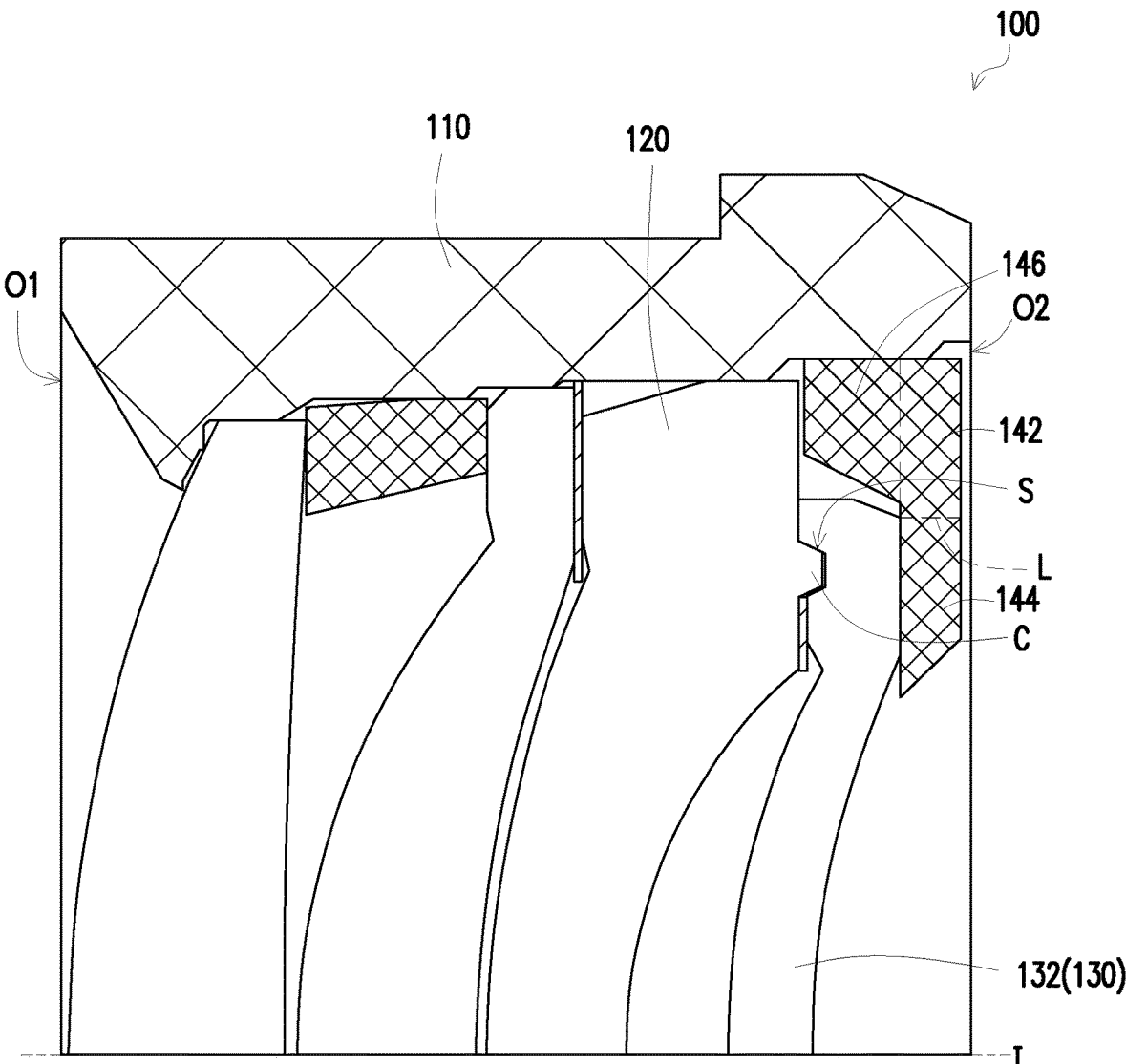
FIG. 2 is a schematic cross-sectional view of an optical lens according to the second embodiment of the disclosure.

FIG. 2 is a schematic cross-sectional view of an optical lens according to the second embodiment of the disclosure. Please refer to FIG. 2. The optical lens 100 of this embodiment is similar to the optical lens 100 shown in FIG. 1. The difference between the two is that, in this embodiment, a water absorption rate of any lens in the lens element group 130 is greater than the water absorption rate of the first lens element 120. The lens element group 130 and the first lens element 120 have a fitting surface S inclined to the optical axis I, and the lens element group 130 is positioned on the side of the fitting surface S away from the optical axis I. In this embodiment, the second lens element 132 of the lens element group 130 is fitted with the first lens element 120. However, the disclosure does not limit the type of the second lens element 132 and the number of optical lenses in the lens element group 130. Therefore, this configuration may avoid two adjacent lens elements from having different water absorption rates due to the selection of different materials, resulting in the generation of internal stress inside the lens elements and further resulting in changes in the distance or shape of the lens elements and affecting the optical performance. In this embodiment, when the fitting surface of the lens element group 130 with high water absorption rate is outside the fitting surface S of the first lens element 120 with low water absorption rate, it may avoid the situation that the stress generated by the lens element group 130 with high water absorption rate affects the inner diameter of the first lens element 120 with low water absorption rate, which corrects and balances aberrations and reduces the possibility of decentering of the lens elements.

Figure 3:
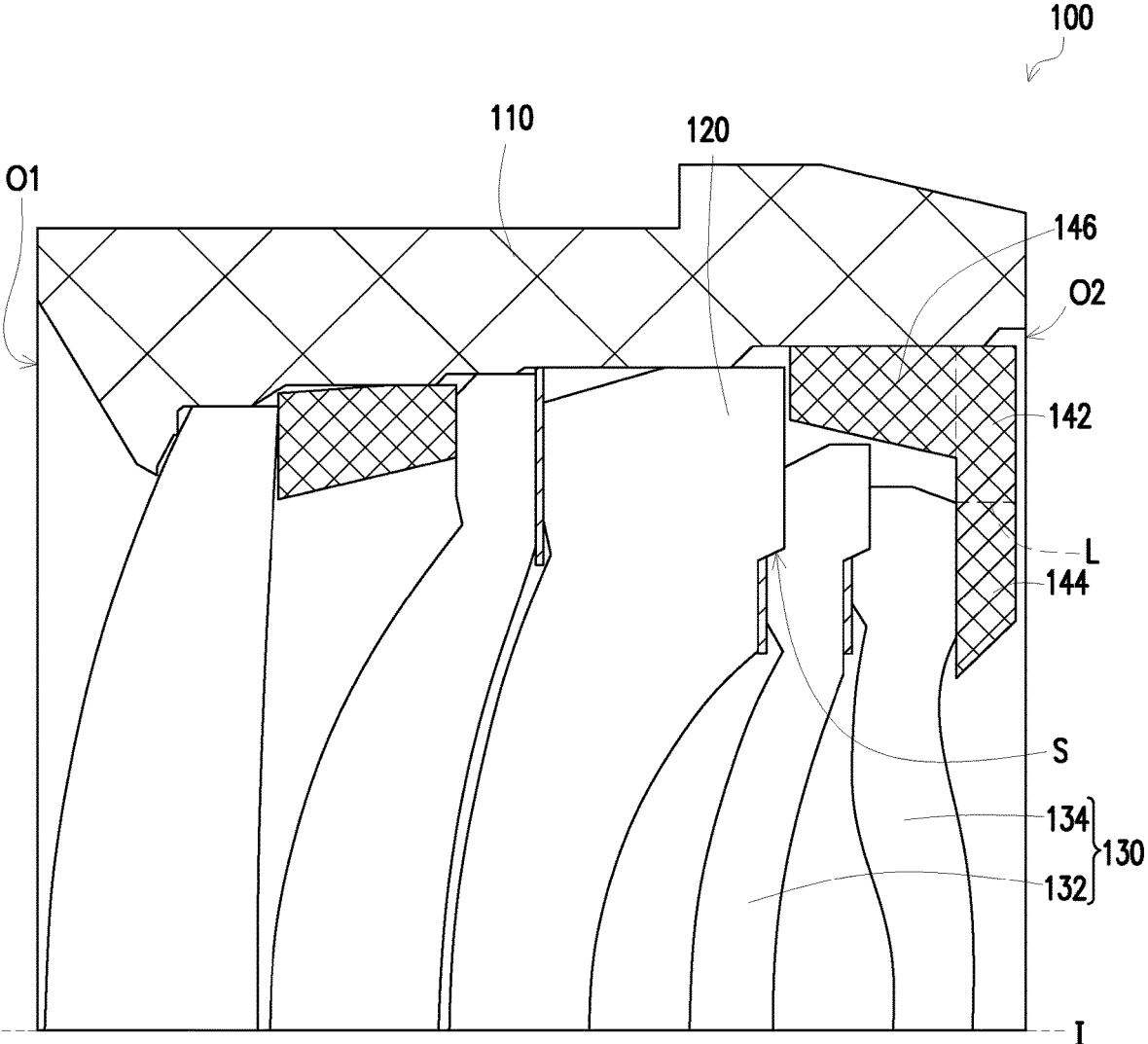
FIG. 3 is a schematic cross-sectional view of an optical lens according to the third embodiment of the disclosure.

FIG. 3 is a schematic cross-sectional view of an optical lens according to the third embodiment of the disclosure. Please refer to FIG. 3. The optical lens 100 of this embodiment is similar to the optical lens 100 shown in FIG. 1. The difference between the two is that, in this embodiment, the lens element group 130 includes the second lens element 132 and a third lens element 134. The second lens element 132 is positioned between the first lens element 120 and the third lens element 134; the second lens element 132 is fitted with the first lens element 120; and the third lens element 134 abuts against the bearing portion 144 of the optical element 140. In other words, the disclosure does not limit the number of lenses in the lens element group 130, and the disclosure still has good efficacy. It should be noted that the disclosure does not limit the total number of lenses in the optical lens 100. However, in order for the optical lens 100 to have a smaller volume, the total number of lens elements in the optical lens 100 does not exceed six.

To sum up, in the optical lens of the disclosure, the optical element includes a fixing portion and a bearing portion connected to each other. The fixing portion abuts against a lens barrel, and the bearing portion abuts against a lens element group. The fixing portion has a protrusion extending toward a direction of the first lens element, and the protrusion is positioned between the lens barrel and the lens element group in a radial direction. In this way, a contact area between the optical element and the lens barrel may be increased by the protrusion, which extends toward the first lens element, of the optical element disposed on the optical lens, so as to ensure an adhesive area between the optical element and the lens barrel after glue dispensing. Therefore, the lens may be effectively fixed with sufficient thrust in a direction parallel to the optical axis. On the other hand, the protrusion between the lens barrel and a maximum outer diameter of the lens element in the lens element group may also keep the lens element group away from an inner wall of the lens barrel, so as to avoid the glue that is dispensed on the lens barrel from pulling or squeezing the lens element group due to a deformation of the glue during a curing process, which in turn causes decentering.

Although the disclosure has been disclosed as above with reference to the embodiments, the embodiments are not intended to limit the disclosure. Anyone with ordinary knowledge in the technical field may make some changes and modifications without departing from the spirit and scope of the disclosure. The protection scope of the disclosure shall be determined by the appended claims.

What is claimed is:

1. An optical lens with an optical axis, comprising:
   a lens barrel with a first opening and a second opening opposite to each other, wherein the first opening is smaller than the second opening;
   a first lens element abutting against the lens barrel;
   a lens element group fitted with and embedded in the first lens element; and
   an optical element, comprising:
   a fixing portion and a bearing portion connected to each other, wherein,
   the fixing portion abuts against the lens barrel;
   the bearing portion abuts against the lens element group;
   the fixing portion has a protrusion extending toward a direction of the first lens element, wherein the protrusion of the fixing portion abuts against the lens barrel;
   the protrusion is positioned between the lens barrel and the lens element group in a radial direction; and
   the first lens element, the lens element group, and the optical element are sequentially arranged from the first opening to the second opening, wherein the first lens element directly touches the lens element group.

2. The optical lens of claim 1, wherein the lens element group further comprises:
   a second lens element and a third lens element, wherein,
   the second lens element is positioned between the first lens element and the third lens element;
   the second lens element is fitted with the first lens element; and
   the third lens element abuts against the bearing portion of the optical element.

3. The optical lens of claim 1, wherein a minimum distance from the lens element group to the lens barrel is greater than or equal to 0.150 mm.

4. The optical lens of claim 1, wherein, on a reference plane perpendicular to the optical axis, a minimum distance between the protrusion and the lens element group on the reference plane is greater than or equal to 0.020 mm.

5. The optical lens of claim 1, wherein the optical lens satisfies the following formula: $3{,}000 \leq ODLA/(ODR-ODLB) \leq 10{,}000$, wherein
   ODLA is a maximum outer diameter of the first lens element;
   ODR is a maximum outer diameter of the optical element; and
   ODLB is a maximum outer diameter of the lens element group.

6. The optical lens of claim 1, wherein the optical lens satisfies the following formula: ALAR−ODLB≥0.300 mm, wherein ALAR is an average value of a maximum outer diameter of the first lens element and a maximum outer diameter of the optical element; and ODLB is a maximum outer diameter of the lens element group.

7. The optical lens of claim 1, wherein a minimum distance from the first lens element to the optical element in a direction of the optical axis is less than or equal to 0.100 mm.

8. The optical lens of claim 1, wherein a water absorption rate of any lens element in the lens element group is greater than a water absorption rate of the first lens element.

9. The optical lens of claim 8, wherein a fitting surface inclined to the optical axis is formed between the lens element group and the first lens element, and the lens element group is positioned on a side of the fitting surface away from the optical axis.

10. The optical lens of claim 1, wherein the optical lens satisfies the following formula: DR/DA≥1.500, wherein DR is a length of the fixing portion of the optical element and the lens barrel along a direction parallel to the optical axis; and DA is a minimum distance from the first lens element to the optical element in a direction of the optical axis.

11. An optical lens, comprising:

a lens barrel with a first opening and a second opening opposite to each other, wherein the first opening is smaller than the second opening;

a first lens element abutting against the lens barrel;

a lens element group fitted with and embedded in the first lens element; and an optical element, comprising:

a fixing portion and a bearing portion connected to each other, wherein, the fixing portion abuts against the lens barrel;

the bearing portion abuts against the lens element group;

the fixing portion has a protrusion extending toward a direction of the first lens element, wherein the protrusion abuts against the lens barrel;

a minimum vertical distance from the fixing portion to an optical axis is greater than a maximum vertical distance from the bearing portion to the optical axis; and the first lens element, the lens element group, and the optical element are sequentially arranged from the first opening to the second opening, wherein the first lens element directly touches the lens element group.

12. The optical lens of claim 11, wherein the lens element group further comprises:

a second lens element and a third lens element, wherein, the second lens element is positioned between the first lens element and the third lens element;

the second lens element is fitted with the first lens element; and the third lens element abuts against the bearing portion of the optical element.

13. The optical lens of claim 11, wherein the optical lens satisfies the following formula: 3,000≤ODLA/(ODR−ODLB)≤10,000, wherein ODLA is a maximum outer diameter of the first lens element;

ODR is a maximum outer diameter of the optical element; and

ODLB is a maximum outer diameter of the lens element group.

14. The optical lens of claim 11, wherein the optical lens satisfies the following formula: ALAR−ODLB≥0.300 mm, wherein ALAR is an average value of a maximum outer diameter of the first lens element and a maximum outer diameter of the optical element; and ODLB is a maximum outer diameter of the lens element group.

15. The optical lens of claim 11, wherein a minimum distance from the first lens element to the optical element in a direction of the optical axis is less than or equal to 0.100 mm.

16. The optical lens of claim 11, wherein the optical lens satisfies the following formula: DR/DA≥1.500, wherein DR is a length of the fixing portion of the optical element and the lens barrel along a direction parallel to the optical axis; and DA is a minimum distance from the first lens element to the optical element in a direction of the optical axis.

17. The optical lens of claim 11, wherein the optical lens satisfies the following formula: ODLB/TLB≤7.500, wherein ODLB is a maximum outer diameter of the lens element group; and TLB is a thickness of a lens element with a maximum outer diameter in the lens element group on the optical axis.

18. The optical lens of claim 11, wherein a thickness of any lens element in the lens element group on the optical axis is less than or equal to a thickness of the first lens element on the optical axis.

19. The optical lens of claim 11, wherein an optical effective diameter of any lens element in the lens element group is smaller than an optical effective diameter of the first lens element.

20. The optical lens of claim 11, wherein a minimum thickness of the fixing portion of the optical element in a direction perpendicular to the optical axis is 0.100 mm.

* * * * *